(12) United States Patent
Kwon et al.

(10) Patent No.: US 7,521,005 B2
(45) Date of Patent: Apr. 21, 2009

(54) ELECTROCHROMIC MATERIAL WITH IMPROVED LIFETIME

(75) Inventors: Won Jong Kwon, Daejeon (KR); Ki Seok Jang, Daegu (KR); Sang Ho Kim, Daejeon (KR); Shin Jung Choi, Busan (KR); Jin Young Park, Gwangju (KR); Young Hee Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 380 days.

(21) Appl. No.: 11/015,282

(22) Filed: Dec. 20, 2004

(65) Prior Publication Data

US 2005/0179012 A1 Aug. 18, 2005

(30) Foreign Application Priority Data

Dec. 22, 2003 (KR) .................... 10-2003-0094546

(51) Int. Cl.
*C09K 9/02* (2006.01)
*F21V 9/00* (2006.01)

(52) U.S. Cl. .................... 252/583; 252/582; 252/586

(58) Field of Classification Search ................ 252/582, 252/583, 586; 255/258
See application file for complete search history.

(56) References Cited

U.S. PATENT DOCUMENTS

| 5,336,448 | A | * | 8/1994 | Byker ..................... 252/583 |
| 5,441,827 | A | | 8/1995 | Gratzel et al. |
| 5,668,663 | A | | 9/1997 | Varaprasad et al. |
| 5,985,184 | A | | 11/1999 | Lynam |
| 6,208,452 | B1 | * | 3/2001 | Nishikitani et al. ......... 359/270 |
| 6,241,916 | B1 | | 6/2001 | Claussen et al. |
| 6,605,239 | B2 | | 8/2003 | Fitzmaurice et al. |
| 6,639,709 | B2 | | 10/2003 | Vincent et al. |
| 2003/0039020 | A1 | | 2/2003 | Lomprey et al. |
| 2003/0206326 | A1 | | 11/2003 | Berneth et al. |
| 2003/0234379 | A1 | * | 12/2003 | Burrell et al. .............. 252/62.2 |

FOREIGN PATENT DOCUMENTS

| JP | 04-102831 | 4/1992 |
| JP | 05-170738 | 7/1993 |
| JP | 2001-181293 | 7/2001 |
| JP | 2001-194689 | 7/2001 |
| JP | 2001510590 | 7/2001 |
| JP | 2001-209078 | 8/2001 |
| JP | 2002-049061 | 2/2002 |
| WO | WO 98/35267 | 8/1998 |
| WO | WO 2004/067673 | 8/2004 |

OTHER PUBLICATIONS

Bard, Allen J. et al., *Controlled Potential Microelectrode Techniques—Potential Sweep Methods*, Electrochemical Methods: Fundamentals and Applications, 1980, Chapter 6, pp. 213-249.
M. Felderhoff et al., "Molecular Suppression of the Pimerization of Viologens (=4,4'-Bipyridinium Derivatives) Attached to Nanocrystalline Titanium Dioxide Thin-Film Electrodes," Helvetica Chimica Acta—vol. 83 (2000), pp. 181-192.
S. Nagarajo Rao, et al; "Heterosupramolecular Chemistry: Synthetic Strategies for the Covalent and Noncovalent Assembly and organization of Nanocrystals and Molecules", Helvetica Chimica Acta, vol. 81, pp. 902-915; 1998.

* cited by examiner

*Primary Examiner*—Timothy J. Kugel
(74) *Attorney, Agent, or Firm*—McKenna Long & Aldridge LLP (57) ABSTRACT

Disclosed are viologen derivatives as an electrochromic material having improved stability and lifetime, a metal oxide electrode including the same, and an electrochromic device using the viologen derivative as an electrochromic material. The viologen derivative includes a suitable regulator group capable of increasing $\Delta E$ that is a potential difference between $E_1$ (potential at the first redox reaction) and $E_2$ (potential at the second redox reaction). When $\Delta E$ increases, the mole fraction of viologen molecules present in the second reduction state decreases. Therefore, it is possible to lower the mole fraction of viologen molecules present in an irreversibly reduced state at an applied potential, thereby increasing the lifetime of an electrochromic material and an electrochromic device.

14 Claims, 1 Drawing Sheet

ELECTROCHROMIC MATERIAL WITH IMPROVED LIFETIME

CROSS-REFERENCE TO RELATED APPLICATIONS

This application claims the benefit of Korean Patent Application No. 10-2003-94546 filed Dec. 22, 2003 in Korea, which are hereby incorporated by reference in their entirety.

TECHNICAL FIELD

The present invention relates to viologen derivatives as an electrochromic material having improved stability and lifetime, a metal oxide electrode including the same, and an electrochromic device using the viologen derivative as an electrochromic material.

BACKGROUND ART

In general, the so-called "electrochromism" is a phenomenon in which a color change arises depending on potentials of an applied electric field. Use of the electrochromism results in production of electro-photoswitchable devices such as electrochromic devices, information memory devices, and solar cells. Typical electrochromic materials include inorganic metal oxides such as tungsten trioxide ($WO_3$), nickel oxide (NiO) and titanium dioxide ($TiO_2$), and organic electrochromic materials including bipyridinium salt (viologen) derivatives, quinone derivatives such as anthraquinone and azine derivatives such as phenothiazine.

Though the electrochromism was known in 1961, practical use and commercial mass production of electrochromic devices have been limited because of their shortcomings, such shortcomings being that it is difficult to realize multiple colors, coloring/bleaching rates are low, it is difficult to accomplish complete bleaching, and electrochromic materials tend to be damaged easily during repeated coloring/bleaching cycles due to their poor stability.

U.S. Pat. No. 5,441,827 (Graetzel et al.) discloses a device such as a photocell, photochromic device or an electrochromic device, having high surface area of an electrode, high concentration of electroactive materials, high efficiency and fast response speed, the device being manufactured by coating an electroactive organic material, as a monolayer, onto the surface of a nanoporous metal oxide thin film electrode obtained by sintering metal oxide nanoparticles. The device substantially solves the problems with which electrochromic devices according to the prior art are faced.

PCT International Publication No. WO 98/35267 (Fitzmaurice et al.) discloses an electrochromic device capable of repeating coloring/bleaching cycles 10,000 times or more at room temperature, the device being a more specified version of the above-mentioned metal oxide thin film-based electrochromic device. However, lifetime of electrochromic devices should be increased to 100,000 cycles or more in order to commercialize electrochromic devices and to expand application of electrochromic devices.

DISCLOSURE OF THE INVENTION

Viologen compounds are those containing 4,4'-bipyridinium, and have three oxidation states, i.e., $bipm^{2+}$, $bipm^+$ and $bipm^0$, as represented by the following scheme:

Particularly, the redox reaction of $bipm^{2+} \leftrightarrow bipm^+$ occurs at redox potential $E_1$ and is reversible. Though the redox reaction of $bipm^+ \leftrightarrow bipm^0$ occurs at redox potential of $E_2$, it is frequently irreversible. $Bipm^0$ is chemically unstable and thus tends to react with molecular oxygen or other solvent molecules to be transformed into a molecule having a different chemical structure, thereby losing its function as an electrochromic material. Redox reactions of a bipyridinium ion occur at $E_1$ and $E_2$, in turn. However, the half wave potentials $E_1$ and $E_2$ are merely the voltage values where oxidation rate becomes equal to reduction rate so as to accomplish a dynamic equilibrium state. Moreover, redox reactions occur not only at the half wave potentials but continuously occur at any other potentials, and each of $bipm^{2+}$, $bipm^+$ and $bipm^0$ is present at different mole fractions. Distribution of each chemical species according to potential follows the Boltzman Distribution. Therefore, the present inventors have made an attempt to decrease the mole fraction of $bipm^0$ at the half wave potential $E_1$ by increasing $\Delta E$ that is a potential difference between $E_1$ and $E_2$. We thought that a decrease in the mole fraction of $bipm^0$ species at the half wave potential $E_1$ might result in improvement in lifetime of electrochromic devices, because the state of $bipm^0$ is chemically unstable and has a strong tendency toward irreversible redox reactions.

Under these circumstances, we introduced various regulator groups into viologen derivatives to increase $\Delta E$. As a result, we found an electrochromic material based on a viologen derivative and an electrochromic device showing higher optical density and having an improved lifetime.

According to an aspect of the present invention, there is provided an electrochromic material including a viologen compound having a regulator group linked to 4,4'-bipyridinium having three types of oxidation states, i.e., $bipm^{2+}$, $bipm^+$ and $bipm^0$, as represented by the following scheme, the regulator group being capable of increasing $\Delta E$ that is a potential difference between $E_1$ and $E_2$:

wherein each of $E_1$ and $E_2$ represents a redox potential.

According to another aspect of the present invention, there is provided an electrochromic material including a viologen compound having an electropositively charged cationic regulator group linked to 4,4'-bipyridinium.

According to still another aspect of the present invention, there is provided an electrochromic material including a viologen compound having a redox couple regulator group linked to 4,4'-bipyridinium, the redox couple regulator group being capable of forming a redox couple electrically with a bipyridinium ring.

According to still another aspect of the present invention, there are provided a metal oxide electrode coated with the above-described electrochromic material and an electrochromic device including the same electrochromic material.

According to still another aspect of the present invention, the present invention provides a compound represented by the following formula 1:

[formula 1]

wherein each of $R^1$, $R^2$, $R^4$ and $R^5$ independently or simultaneously represents H, a C1-C6 alkyl group, OH, $OR^{97}$, CN, $NO_2$, COOH, $CO_2R^{97}$, $CONH_2$, $CONR^{98}_2$ or $NR^{98}_2$ (preferably, each of $R^1$, $R^2$, $R^4$ and $R^5$ represents H); each of $R^{97}$ and $R^{98}$ represents a C1-C6 alkyl group, preferably a C1-C2 alkyl group; and either or both of linker 1 and linker 2 may be present, as necessary.

Typical examples of the compound represented by formula 1 include a compound represented by the following formula 1-1:

[formula 1-1]

wherein each of $R^1$, $R^2$, $R^4$ and $R^5$ independently or simultaneously represents H, a C1-C6 alkyl group, OH, $OR^{97}$, CN, $NO_2$, COOH, $CO_2R^{97}$, $CONH_2$, $CONR^{98}_2$ or $NR^{98}_2$ (preferably, each of $R^1$, $R^2$, $R^4$ and $R^5$ represents H); and each of $R^{97}$ and $R^{98}$ represents a C1-C6 alkyl group, preferably a C1-C2 alkyl group.

Hereinafter, the present invention will be explained in more detail.

A viologen compound has a structure in which two pyridinium rings are attached to each other as depicted in the following scheme:

When a viologen compound is present in the state of $bipm^{2+}$, two pyridinium rings are orthogonal to each other and has no resonance structure between them. Therefore, the state of $bipm^{2+}$ is a very stable, colorless and transparent state. However, while $bipm^{2+}$ accepts an electron to be reduced to the state of $bipm^-$, two pyridinium rings rotate to be present on the same plane and electric charges are delocalized according to the occurrence of the resonance between two pyridinium rings, thereby producing a deep color. In the state of $bipm^0$, two pyridinium rings form a complete planar structure and steric hindrance is generated between 3,3'-hydrogen atoms, thereby making the molecule unstable. In this state, other molecules such as solvent molecules may cause addition-elimination reactions on carbon atoms of the ring.

Therefore, the viologen compound may be transformed into completely different types of molecules or may be subjected to ring opening in the presence of heat or light to be decomposed into completely different molecules, such transformations being irreversible. The resultant compound does not have electrochromic activity any longer. Additionally, when the viologen molecule has a planar structure, an aromatic-aromatic stacking phenomenon may occur due to pi-pi ($\pi$-$\pi$) interactions. Therefore, adjacent viologen molecules aggregate among themselves. Each of the states of $bipm^+$ and $bipm^0$ having a planar structure is a high-energy state by nature. Aggregation of high-energy molecules may cause a self-quenching phenomenon and side reactions including polymerization reactions, followed by an irreversible transformation of an electrochromic material resulting in reduced lifetime in an electrochromic device.

Because such collapses and irreversible changes in viologen derivatives occur largely in the state of $bipm^0$, it is necessary to minimize the mole fraction occupied by $bipm^0$ at a drive voltage in order to obtain an electrochromic viologen derivative having longer lifetime.

To accomplish this, according to the technical gist of the present invention, a bipyridinium ion is provided with a regulator group at its end, the regulator group being suitable to stabilize the state of $bipm^+$ and to prevent $bipm^+$ from being transformed into $bipm^0$. Such regulator groups can increase $\Delta E$ that is a potential difference between $E_1$ (electrochemical potential where a transformation into $bipm^+$ occurs) and $E_2$ (electrochemical potential where a transformation into $bipm^0$ occurs).

The regulator group preferably increases $\Delta E$ by 0.04V or more.

Relative mole fractions of various chemical species follow the Boltzman Distribution, wherein the number of each chemical species is in direct proportion to the electric current used for redox reactions. More particularly, the electric current used for redox reactions at each electric potential is determined by the following formula (see, Allen J. Bard, and Larry R. Faulkner, "Electrochemical Methods: Fundamentals and Applications", John Wiley & Sons, 1980, Chap. 6):

$$I = nFAC_0^*(\pi D_o \sigma)^{1/2} \chi(\sigma t)$$

wherein

I is the maximum current resulting from redox reactions at a given applied potential;

n is the number of electrons coming in and out according to redox reactions;

F is the Faraday constant;

$C_0$ is the concentration of an oxidative/reductive species in solution;

$D_0$ is a diffusion coefficient; and $\chi(\sigma t)$ is an electric current function resulting from reversible charge transfer.

Particularly, $(\pi)^{1/2}\chi(\sigma t)$ is a function having an exponential relationship with an electric potential difference between applied potential and half wave potential. More particularly, whenever the applied potential varies from the $E_{1/2}$ (half-wave potential) value by 20 mV, the function, $(\pi)^{1/2}\chi(\sigma t)$ decreases in the ratio of about 1/2. In other words, whenever $\Delta E$ increases by 20 mV (0.02V), the mole fraction of $bipm^0$ at the applied voltage decreases in the ratio of 1/2. Therefore, when $\Delta E$ varies by 40 mV or more, the mole fraction of $bipm^0$ decreases by 1/4 or less of the initial value, and thus it is possible to observe a significant increase in the lifetime of an electrochemical device.

According to the present invention, the regulator group capable of increasing $\Delta E$ includes: (1) an cationic functional group; and (2) an additional redox-coupled functional group capable of forming a redox couple electrically with a bipyridinium ring.

An electric potential where redox reactions occur is determined by the energy level of each oxidation state under a given electric field.

A cationic regulator group increases positive charge density in the whole molecule and changes the charge density of a bipyridinium ring at each oxidation state, thereby changing energy level at each oxidation state. Because a change in energy level at each oxidation state is followed by a change in redox potentials, it is possible to control $\Delta E$. Additionally, cationic properties increased by a cationic regulator group can decrease aggregation of adjacent viologen molecules due to the effect of repulsive force between molecules having the same charge. Furthermore, such increased cationic properties can inhibit a self-quenching phenomenon and side reactions including polymerization reactions. As a result, it is possible to increase the lifetime of a viologen derivative.

Meanwhile, when the regulator group is an additional redox-coupled functional group capable of forming a redox couple electrically with a bipyridinium ring, a change in redox states of the regulator group affects the charge distribution of the whole molecule and changes the redox potential of a bipyridinium ring. Therefore, it is possible to increase the lifetime of an electrochromic viologen derivative.

Such regulator groups may be linked directly to a viologen derivative without any linker or may be attached to a viologen derivative by means of a linker (linker 1).

Additionally, the viologen derivative according to the present invention may further comprise an anchor group capable of anchoring to a metal oxide electrode so as to show its function sufficiently when it is coated on the metal oxide electrode for an electrochromic device. Such anchor groups may be linked directly to a viologen derivative without any linker or may be attached to a viologen derivative by means of a linker (linker 2), in the same manner as the regulator group.

Therefore, according to a preferred embodiment of the present invention, there is provided a viologen derivative as an electrochromic material, the viologen derivative being [regulator group]-[linker 1]-[bipyridinium (bipm)]-[linker 2]-[anchor group], as depicted in the following formula:

The cationic regulator groups that may be used in the present invention include substituted pyridinium derivatives represented by the following formula 2, substituted quinolinium derivatives represented by the following formula 3, substituted imidazolium derivatives represented by the following formula 4 and tetraalkylammonium derivatives represented by the following formula 5:

[formula 2]

wherein each of $R^1$, $R^2$, $R^3$, $R^4$ and $R^5$ independently or simultaneously represents H, a C1-C6 alkyl group, OH, $OR^{97}$, CN, $NO_2$, COOH, $CO_2R^{97}$, $CONH_2$, $CONR^{98}_2$ or $NR^{98}_2$ (preferably, each of $R^1$, $R^2$, $R^4$ and $R^5$ represents H, and $R^3$ represents $N(CH_3)_2$ or $OR^{97}$); and each of $R^{97}$ and $R^{98}$ represents a C1-C6 alkyl group, preferably a C1-C2 alkyl group.

[formula 3]

wherein each of $R^6$, $R^7$, $R^8$, $R^9$, $R^{10}$, $R^{11}$ and $R^{12}$ independently or simultaneously represents H, a C1-C6 alkyl group, OH, $OR^{97}$, CN, $NO_2$, COOH, $CO_2R^{97}$, $CONH_2$, $CONR^{98}_2$ or $NR^{98}_2$ (preferably each of $R^6$, $R^7$, $R^9$, $R^{10}$, $R^{11}$ and $R^{12}$ represents H, and $R^8$ represents $N(CH_3)_2$ or $OR^{97}$); and each of $R^{97}$ and $R^{98}$ represents a C1-C6 alkyl group, preferably a C1-C2 alkyl group.

[formula 4]

wherein each of $R^{13}$, $R^{14}$, $R^{15}$ and $R^{16}$ independently or simultaneously represents H or a C1-C6 alkyl group (preferably, each of $R^{13}$, $R^{15}$ and $R^{16}$ represents H and $R^{14}$ represents a C1-C6 alkyl group).

[formula 5]

wherein each of $R^{17}$, $R^{18}$ and $R^{19}$ independently or simultaneously represents H or a C1-C12 alkyl group, preferably a C1-C4 alkyl group.

The redox couple-functional groups that may be used in the present invention include ferrocene derivatives represented by the following formula 6; azine derivatives represented by the following formulae 7 and 8, including phenothiazines, phenoxazines and phenazines; quinone derivatives represented by the following formulae 9-13, including benzoquinones, hydroquinones, naphtoquinones, anthraquinones and acenaphthene quinones (formula 13); and multicyclic aromatic compounds including pyrenes represented by the following formula 14, perylenes represented by the following formula 15 and dancyls represented by the following formula 16:

[formula 6]

substituted ferrocene regulator groups wherein each of $R^{20}$ to $R^{28}$ independently or simultaneously represents H or a C1-C6 alkyl group (preferably, all of $R^{20}$ to $R^{28}$ simultaneously represents H or methyl); X represents $CH_2$, O, S, NH, $NR^{98}$ or $CO_2$; and $R^{98}$ represents a C1-C6 alkyl group, preferably a C1-C2 alkyl group.

[formula 7]

substituted azine regulator groups wherein X represents S, O or Se; each of $R^{29}$ to $R^{36}$ independently or simultaneously represents H, a C1-C6 alkyl group, OH, $OR^{97}$, CN, $NO_2$, COOH, $CO_2R^{97}$, $CONH_2$, $CONR^{98}_2$ or $NR^{98}_2$ (preferably, each of $R^{29}$, $R^{30}$, $R^{32}$, $R^{33}$, $R^{35}$ and $R^{36}$ represents H and each of $R^{31}$ and $R^{34}$ represents Br, $NR^{98}_2$ or $OR^{97}$); and each of $R^{97}$ and $R^{98}$ represents a C1-C6 alkyl group, preferably a C1-C2 alkyl group.

[formula 8]

substituted azine regulator groups wherein each of $R^{37}$ to $R^{45}$ independently or simultaneously represents H, C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, each of $R^{37}$, $R^{40}$, $R^{41}$ and $R^{44}$ represents H, each of $R^{38}$, $R^{39}$, $R^{42}$ and $R^{43}$ represents Br, $NR^{98}{}_2$ or $OR^{97}$, and $R^{45}$ represents a C1-C6 alkyl group); and each of $R^{97}$ and $R^{98}$ represents a C1-C6 alkyl group, preferably a C1-C2 alkyl group.

[formula 9-12]

substituted quinone regulator groups wherein each of $R^{46}$ to $R^{63}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, all of $R^{46}$ to $R^{63}$ simultaneously represents H); X represents $CH_2$, O, S, NH, $NR^{98}$ or $CO_2$ (wherein the position of X may be either of a-position and b-position of anthracene in the case of anthraquinone); and each of $R^{97}$ and $R^{98}$ represents a C1-C6 alkyl group, preferably a C1-C2 alkyl group.

[formula 13]

substituted acenaphthene quinone regulator groups wherein X represents $CH_2$, O, S, NH, $NR^{98}$ or $CO_2$; each of $R^{84}$ to $R^{88}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, all of $R^{84}$ to $R^{88}$ simultaneously represents H); and each of $R^{97}$ and $R^{98}$ represents a C1-C6 alkyl group, preferably a C1-C2 alkyl group.

[formula 14]

substituted pyrene regulator groups wherein X represents $CH_2$, O, S, NH, $NR^{98}$ or $CO_2$; each of $R^{64}$ to $R^{72}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, all of $R^{64}$ to $R^{72}$ simultaneously represents H); and each of $R^{97}$ and $R^{98}$ represents a C1-C6 alkyl group, preferably a C1-C2 alkyl group.

[formula 15]

substituted perylene regulator groups wherein X represents $CH_2$, O, S, NH, $NR^{98}$ or $CO_2$; each of $R^{73}$ to $R^{83}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, all of $R^{73}$ to $R^{83}$ simultaneously represents H); and each of $R^{97}$ and $R^{98}$ represents a C1-C6 alkyl group, preferably a C1-C2 alkyl group.

[formula 16]

substituted dancyl regulator groups wherein each of $R^{89}$ to $R^{94}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$ (preferably, all of $R^{89}$ to $R^{94}$ simultaneously represents H); each of $R^{95}$ and $R^{96}$ independently or simultaneously represents H or a C1-C6 alkyl group, preferably a C1-C2 alkyl group; and each of $R^{97}$ and $R^{98}$ represents a C1-C6 alkyl group, preferably a C1-C2 alkyl group.

Anchor groups that may be used in the present invention include phosphonic acid represented by the following formula 17, salicylic acid represented by the following formula 18, boronic acid represented by the following formula 19, iminodiacetic acid represented by the following formula 20 and ortho-dihydroxyaryl (catechol) represented by the following formula 21:

[formula 17]

[formula 18]

[formula 19]

[formula 20]

[formula 21]

wherein X may be O, NH, $NR^{98}$, S or CO, and $R^{98}$ represents a C1-C6 alkyl group, preferably a C1-C2 alkyl group.

As described above, regulator groups or anchor groups may be linked directly to a bipyridinium ring without any linker or linked to a bipyridinium ring by means of a linker. When a linker is used, the linker (linker 1, linker 2) may be an C1-C4 alkyl chain represented by the following formula 22, xylene (—$CH_2$—Ar—$CH_2$—) represented by the following formula 23, 1,3,5-triazine ($C_3N_3$) represented by the following formula 24, or a substituted aromatic ring represented by the following formula 25. When the linker is an aromatic ring linker, the link may be present at ortho-, meta- and para-positions.

[formula 22]

wherein n is an integer of between 1 and 4.

[formula 23]

[formula 24]

[formula 25]

wherein X may be O, NH, $NR^{98}$, S or CO, and $R^{98}$ represents a C1-C6 alkyl group, preferably a C1-C2 alkyl group.

Counterions of the viologen derivative according to the present invention may include $Cl^-$, $Br^-$, $BF_4^-$, $PF_6^-$, $ClO_4^-$ and $(CF_3SO_2)_2N^-$.

In general, electrochromic materials according to the present invention may be prepared as follows: 4,4'-bipyridine is reacted with one equivalent of an anchor group to obtain a unit formed of bipyridine having an anchor group at one end thereof, i.e., a unit of bipyridinium-(linker)-anchor group. The anchor group may be protected with an ester or ketal protecting group, etc. To accomplish the link, various types of reactions including a nucleophilic substitution reaction, esterification reaction, addition-elimination reaction and metal catalytic reaction may be used depending on the kind of linker. When an addition-elimination reaction or metal catalytic reaction is used, the link can be made without any linker. Next, a regulator group is linked to the pyridine ring remaining in the resultant unit of bipyridinium-(linker)-anchor group, directly without any linker or by using a linker, to form a molecule of regulator group-bipyridinium-anchor group. Then, deprotection of the anchor group may be performed to activate the molecule, if necessary. By doing so, it is possible to obtain an electrochromic material having a regulator group, which is capable of being bonded to an electrode.

The electrochromic device according to the present invention includes a first electrode disposed on a transparent or translucent substrate, a second electrode and an electrolyte, wherein at least one of the first electrode, second electrode and electrolyte includes the electrochromic material according to the present invention.

The electrodes and the electrochromic device may be manufactured by conventional methods known to one skilled in the art, except that the electrochromic material according to the present invention is used (see, U.S. Pat. No. 5,441,827 and PCT International Publication No. WO 98/35267).

Hereinafter, a preferred embodiment of the method for manufacturing the electrochromic device according to the present invention will be described.

A nanoporous metal oxide electrode that may be used in the present invention is prepared as follows: Nanocrystalline metal oxide particles having an average particle size of 2-200 nm were suspended in an organic solvent along with an organic binder to form a paste. Metal oxides that may be used include oxides of a metal selected from the group consisting of titanium, zirconium, hafnium, chrome, molybdenum, tungsten, vanadium, niobium, tantalum, silver, zinc, strontium, iron ($Fe^{2+}$ and $Fe^{3+}$), nickel and perovskites thereof. Preferably, the metal oxide is $TiO_2$, $WO_3$, $MoO_3$, ZnO, $SnO_2$, indium-doped tin oxide or indium-doped zinc oxide. The organic binder has a molecular weight of between several thousands and several millions. Particular examples of the organic binder include alkyl cellulose, dextran, PMMA (poly (methyl methacrylate)) and Carbowax. The organic solvents that may be used include methanol, ethanol, isopropyl alcohol, dimethylglycol dimetylether, propyleneglycol propylether, propylene glycolmethylether acetate and terpineol. The paste is printed on the surface of a conductive electrode by using a printing method such as screen printing, stencil printing, spin coating or doctor blading. The conductive electrode may be an ITO or FTO thin film electrode coated on the surface of glass, or a metal electrode such as gold, silver, aluminum, copper, chrome, chrome/silver alloy or silver/palladium alloy. Then, the resultant assembly of [metal oxide nanoparticle-organic binder/conductive electrode] is sintered at high temperature so as to burn out the organic binder and thus to form nanopores, while the metal oxide nanoparticles are interconnected to form a porous metal oxide electrode. Then, the electrochromic material according to the present invention is coated on the resultant system of [nanoporous metal oxide electrode/conductive electrode] by using a self-assembly process, thereby providing a working electrode for an electrochromic device.

Counter electrodes that may be used include a nanoporous metal oxide electrode obtained as described above, an ITO or FTO thin film electrode coated on the surface of glass, or a metal electrode such as gold, silver, aluminum, copper, chrome, chrome/silver alloy or silver/palladium alloy. A white reflective plate may be optionally inserted between the working electrode and the counter electrode. The white reflective plate may be formed by coating titania or silica nanoparticles having a size of between 200 nm and 600 nm on the surface of counter electrode and then sintering the coated electrode at a temperature of 200° C. or higher.

The electrochromic device according to the present invention may be manufactured by laminating the working electrode with the counter electrode, obtained as described above, by means of an adhesive, injecting an electrolyte and sealing the device. Electrolytes that may be used include liquid electrolytes containing a lithium salt or tetraalkylammonium salt dissolved in a solvent, ionic liquids, gelled lithium salt electrolytes, gelled ionic liquids and mixtures thereof.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

2-(($\alpha$'(4'''-N,N-dimethylpyridinium)-4''-$\alpha$-)-4,4'-bipyridinium)-ethyl phosphonic acid trichloride salt (III) (PV-DMAP)

<Synthesis of PV-DMAP>

[Reaction Scheme 1]

A: THF, 4° C., 2 hr
B: CH$_3$CN, reflux, 24 hr
C: 6 N HCl, reflux, 24 hr

1-(4'-Bromomethyl-benzyl)-4-dimethylamino-pyridinium bromide (I)

30 ml of THF solution containing 1 g of 4-dimethylaminopyridine dissolved therein was added gradually to 100 ml of THF solution containing 4.32 g of dibromo-p-xylene dissolved therein at 4° C. and the mixture was reacted for 2 hours to form precipitate. After filtration, the precipitate was dried under vacuum to obtain 3.23 g of compound (I).

$^1$H-NMR (DMSO-$d_6$; ppm): 8.43(2H), 7.48(2H), 7.39(2H), 7.06(2H), 5.42(2H), 4.70(2H), 3.18(6H); MS(LC): m/z=305 (M$^+$).

N-(phosphono-2-ethyl)-4''-dimethylamino-pyridinium-4,4'-bipyridinium tribromide (II)

4.60 g of compound (I) prepared as described above and 4.00 g of N-(diethylphosphono-2-ethyl)-4,4'-bipyridinium bromide were dissolved in 100 ml of CH$_3$CN and the reaction mixture was reacted under reflux for 24 hours. After filtration, the precipitate was dried under vacuum to obtain 6.81 g of compound (II).

$^1$H-NMR (D$_2$O; ppm): 9.22 (2H), 9.19(2H), 8.64(2H), 8.60(2H), 8.09(2H,d), 7.60(2H,d), 7.48(2H), 6.93(2H), 6.00 (2H), 5.42(2H), 5.07(2H), 4.17(4H), 3.23(6H), 2.86(2H), 1.29(6H).

N-(phosphono-2-ethyl)-4''-dimethylamino-pyridinium-4,4'-bipyridinium trichloride (III)

6.81 g of compound (II) prepared as described above was dissolved in 50 ml of 6N HCl and reacted under reflux for 24 hours. After evaporation of the solvent, recrystallization was performed by using H$_2$O, MeOH and THF to obtain 5.98 g of compound (III).

$^1$H-NMR (D$_2$O; ppm): 9.23 (4H), 8.63(4H), 8.12(2H), 7.65(2H), 7.53(2H), 6.03(2H), 5.45(2H), 5.01(2H), 3.26(6H), 2.57(2H) MS(LC): m/z=489 (M$^+$).

Experimental Example

Measurement of Redox Potentials of Viologen Derivative

The redox potentials of compound (III) in solution were measured by cyclic voltametry. Particularly, cyclic current-voltage curve was determined in aqueous 0.5M KCl solution by using a glassy carbon electrode as a working electrode, Pt electrode as a counter electrode and Ag/AgCl as a reference electrode. As shown in the following Table 1 and FIG. 1, it was possible to observe the first stage of reduction at −0.520 V ($E_1$, reversible) and the second stage of reduction at −0.975 V ($E_2$, irreversible).

<Manufacture of Electrochromic Device Including Metal Oxide Electrode Coated with Viologen Derivative and Determination of Lifetime>

Ti(O-iPr)$_4$ was hydrolyzed to form a colloidal dispersion of TiO$_2$ nanoparticles. The nanoparticles that were initially formed had an average size of 7 nm. The nanoparticles were autoclaved at 200° C. for 12 hours to increase the average size to 12 mm. The solvent was distilled under reduced pressure to the concentration of 160 g/l. Then 40 wt % of Carbowax 20000 (poly(ethylene oxide)) having an average molecular weight of 20,000) based on the weight of TiO$_2$ was added to the solution, thereby forming white titania sol slurry with high viscosity. The slurry was printed on an ITO transparent electrode by using a screen printing process and the printed electrode was sintered at a high temperature of 450° C. to provide a transparent electrode based on TiO$_2$ having nanopores as a working electrode. As a counter electrode, an antimony-doped tin oxide (Sb-doped SnO$_2$) electrode was formed in a similar manner. The surface of the counter electrode was further coated with TiO$_2$ nanoparticles present in the rutile phase by using a screen printing process and then sintered to form a reflective plate.

Figure 2:
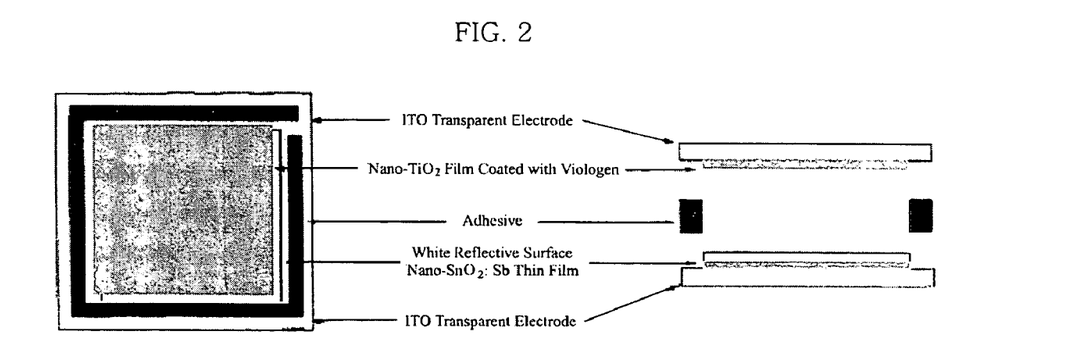
FIG. 2 is a schematic view showing the structure of an electrochromic device including a metal oxide electrode coated with the viologen derivative obtained from Example 1.

The transparent working electrode obtained as described above was immersed in 50 ml of 10 mM aqueous solution of compound (III) for 30 minutes and then washed with 50 ml of ethanol two times. The working electrode was dried at room temperature for 4 hours, and then a thermosetting adhesive was applied on the working electrode so as to be integrated with the counter electrode. Gamma-butyrolactone solution containing 10 mM of LiClO$_4$ was injected as an electrolyte and the resultant device was sealed by UV curing. The resultant electrochromic device (FIG. 2) developed deep blue purple color at 1.0V and showed no deterioration even after 500,000 times of coloring/bleaching cycles.

Comparative Example 1

2-(4-Benzyl-,4'-bipyridinium)ethyl phosphonic acid dichloride salt (VI) (PVB)

[Reaction Scheme 2]

A: Diethyl-(2-bromoethyl) phosphonic acid
B: BzBr, CH$_3$CN, reflux, 6 hr
C: 6 N HCl, reflux, 24 hr 3.12 g of 4,4'-Dipyridyl was mixed with 5.10 g of bisethyl-2-bromoethyl phosphonate and the mixture was reacted for 12 hours at room temperature. 300 ml of cold diethylether was added thereto, followed by stirring for additional 1 hour and filtration of precipitate. The precipitate was washed with 50 ml of diethylether three times and dried under vacuum to obtain 6.21 g of compound (IV).

To 400 ml of CH$_3$CN containing 6.21 g of compound (IV) dissolved therein, 3.70 g of benzyl bromide was added. Next, the mixture was stirred under reflux for 6 hours at 80° C. The reaction mixture was cooled to room temperature and poured into 300 ml of cold diethylether, followed by stirring for additional 1 hour and filtration of precipitate. The precipitate was washed with 50 ml of CH$_3$CN three times and dried under vacuum to obtain 7.44 g of compound (V).

$^1$H-NMR (DMSO-d$_6$; ppm): 9.58(2H), 9.45(2H), 8.83(4H), 7.65(2H), 7.46(3H), 5.99(2H), 4.91(2H), 4.02(4H), 2.76(2H), 1.21(6H).

7.44 g of compound (V) was dissolved in 150 ml of 6N HCl and reacted under reflux for 24 hours. After evaporation of the solvent, recrystallization was performed by using H$_2$O, MeOH and THF to obtain 5.27 g of compound (VI).

$^1$H-NMR (DMSO-d$_6$; ppm): 9.59 (2H), 9.43(2H), 8.84 (2H), 8.80(2H), 7.65(2H), 7.46(3H), 5.98(2H), 4.89(2H), 2.63(2H).

Figure 1:
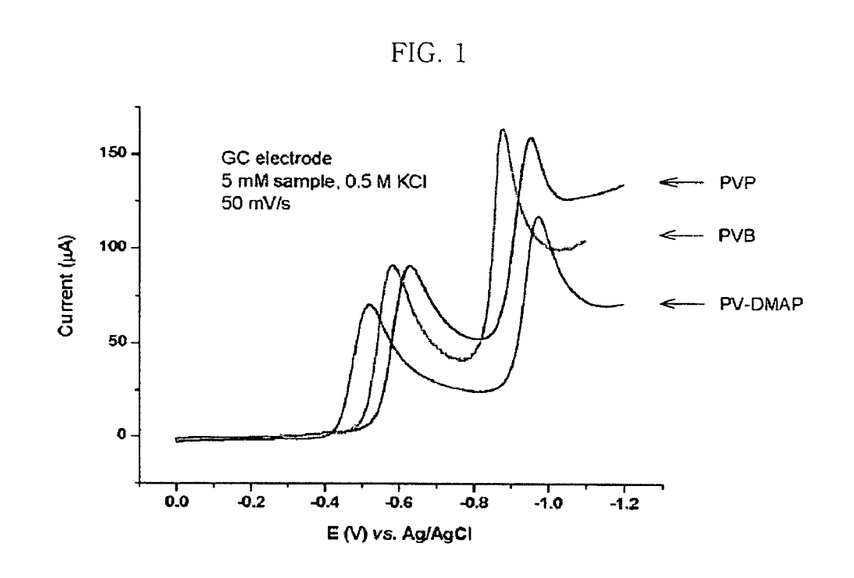
FIG. 1 is a graph showing variations in redox potentials of the viologen derivatives obtained from Example 1 and Comparative Examples 1 and 2.

As shown in Table 1 and FIG. 1, compound (VI) showed the first reduction at −0.586 V (E$_1$, reversible) and the second reduction at −0.879 V (E$_2$, irreversible), under the same conditions as Example 1. An electrochromic device was manufactured in the same manner as Example 1, except that compound (VI) was used instead of compound (III). The resultant electrochromic device showed intense bluish purple color at 1.0V and showed deterioration after 10,000 times of coloring/bleaching cycles.

COMPARATIVE EXAMPLE 2

4,4'-bipyridinium-bis(diethyl phosphonic acid) dichloride salt (VIII) (PVP)

A: 2 eq. of diethyl-(2-bromoethyl) phosphonic acid
C: 6 N HCl, reflux, 24 hr 3.12 g of 4,4'-Dipyridyl was mixed with 10.1 g of diethyl-(2-bromoethyl)phosphonate and the mixture was reacted for 12 hours at room temperature. 500 ml of cold diethylether was added thereto, followed by stirring for additional 1 hour and filtration of precipitate. The precipitate was washed with 50 ml of diethylether three times and dried under vacuum to obtain 11.6 g of compound (VII). 11.6 g of compound (VII) obtained as described above was dissolved in 100 ml of 6N HCl and reacted under reflux for 24 hours. After evaporation of the solvent, recrystallization was performed by using H$_2$O, MeOH and THF to obtain 6.85 g of compound (VIII).

As shown in Table 1 and FIG. 1, compound (VIII) showed the first reduction at −0.630 V (E$_1$, reversible) and the second reduction at −0.955 V (E$_2$, irreversible), when an Ag/AgCl reference electrode was used. An electrochromic device was manufactured in the same manner as Example 1, except that compound (VIII) was used instead of compound (III). The resultant electrochromic device developed deep blue color at 1.3V and showed deterioration after 10,000 times of coloring/bleaching cycles.

TABLE 1

| | Viologen Derivative | V$^{2+}$ → V$^{1+}$ (E$_1$) | V$^{1+}$ → V$^0$ (E$_2$) | Potential Difference (ΔE) |
|---|---|---|---|---|
| Ex. 1 | PV-DMAP | −0.520 | −0.975 | 0.455 |
| Comp. Ex. 1 | PVB | −0.586 | −0.879 | 0.293 |
| Comp. Ex. 2 | PVP | −0.630 | −0.955 | 0.325 |

INDUSTRIAL APPLICABILITY

As can be seen from the foregoing, the viologen derivative according to the present invention is provided with a suitable regulator group capable of increasing ΔE at one end thereof. The viologen derivative can increase the lifetime of an electrochromic device by 3-10 times at a low drive voltage of 1.0V. Additionally, the electrochromic material according to the present invention shows an improved optical density compared to conventional electrochromic materials.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrochromic material, which comprises a viologen compound having a cationic regulator group linked to 4,4'-bipyridinium.

2. The electrochromic material according to claim 1, wherein the regulator group is selected from the group consisting of functional groups represented by the following formulae 2 to 5:

[formula 2]

wherein each of R$^1$, R$^2$, R$^3$, R$^4$ and R$^5$ independently or simultaneously represents H, a C1-C6 alkyl group, OH, OR$^{97}$, CN, NO$_2$, COOH, CO$_2$R$^{97}$, CONH$_2$, CONR$^{98}$$_2$ or NR$^{98}$$_2$; and each of R$^{97}$ and R$^{98}$ represents a C1-C6 alkyl group:

[formula 3]

wherein each of R$^6$, R$^7$, R$^8$, R$^9$, R$^{10}$, R$^{11}$ and R$^{12}$ independently or simultaneously represents H, a C1-C6 alkyl group, OH, OR$^{97}$, CN, NO$_2$, COOH, CO$_2$R$^{97}$, CONH$_2$, CONR$^{98}$$_2$ or NR$^{98}$$_2$; and each of R$^{97}$ and R$^{98}$ represents a C1-C6 alkyl group:

[formula 4]

wherein each of $R^{13}$, $R^{14}$, $R^{15}$ and $R^{16}$ independently or simultaneously represents H or a C1-C6 alkyl group:

[formula 5]

wherein each of $R^{17}$, $R^{18}$ and $R^{19}$ independently or simultaneously represents H or a C1-C12 alkyl group.

3. An electrochromic material, which comprises a viologen compound having an additional redox-coupled functional regulator group linked to 4,4'-bipyridinium, the regulator group being capable of forming a redox couple electrically with a bipyridinium ring.

4. The electrochromic material according to Claim 1 or 3, wherein the regulator group is linked directly to 4,4'-bipyridinium without any linker, or linked to 4,4'-bipyridinium by means of a linker.

5. The electrochromic material according to claim 4, wherein the linker is represented by any one formula selected from the group consisting of the following formulae 22 to 25:

[formula 22]

wherein n is an integer of between 1 and 4:

[formula 23]

[formula 24]

[formula 25]

wherein X represents O, NH, $NR^{98}$, S or CO, and $R^{98}$ represents a C1-C6 alkyl group.

6. The electrochromic material according to claim 1 or 3, wherein an anchor group capable of being bonded to a metal oxide electrode is further linked to 4,4'-bipyridinium, the anchor group being linked directly to 4,4'-bipyridinium without any linker, or linked to 4,4'-bipyridinium by means of a linker.

7. The electroebromic material according to claim 6, wherein the anchor group is selected from the group consisting of functional groups represented by the following formulae 17 to 21:

[formula 17]

[formula 18]

[formula 19]

[formula 20]

[formula 21]

wherein X represents O, NH, $NR^{98}$, S or CO, and $R^{98}$ represents a C1-C6 alkyl group.

8. The electrochromic material according to claim 6, wherein the linker is represented by any one formula selected from the group consisting of the following formulae 22 to 25:

[formula 22]

wherein n is an integer of between 1 and 4

[formula 23]

[formula 24]

(see image)

[formula 25]

(see image)

wherein X represents O, NH, $NR^{98}$, S or CO, and $R^{98}$ represents a C1-C6 alkyl group.

9. The electrochromic material according to claim 1 or 3, wherein the electrochromic material comprises a viologen compound having a regulator group linked to 4,4'-bipyridinium having three oxidation states, $bipm^{2+}$, $bipm^+$ and $bipm^0$, as represented by the following scheme, the regulator group being capable of increasing $\Delta E$ that is a potential difference between $E_1$ and $E_2$:

wherein each of $E_1$ and $E_2$ is a redox potential.

10. The electrochromic material according to claim 9, wherein the regulator group is capable of increasing ΔE by 0 04V or more.

11. The electrochromic material according to claim 1 or 3, wherein the viologen compound further includes a counterion, the counterion being $Cl^-$, $Br^-$, $BF_4^-$, $PF_6^-$, $ClO_4^-$ or $(CF_3SO_2)_2N^-$.

12. The electrochromic material according to claim 3, wherein the regulator group is selected from the group consisting of functional groups represented by the following formulae 7 to 16:

[formula 7]

wherein X represents S, O or Se; each of $R^{29}$ to $R^{36}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$; and each of $R^{97}$ and $R^{98}$ represents a C1-C6 alkyl group:

[formula 8]

wherein each of $R^{37}$ to $R^{45}$ independently or simultaneously represents H, a C1-C6 alkyl group, OH, $OR^{97}$, CN, $NO_2$, COOH, $CO_2R^{97}$, $CONH_2$, $CONR^{98}{}_2$; and each of $R^{97}$ and $R^{98}$ represents a C1-C6 alkyl group:

[formulae 9-12]

formula 9 formula 10 formula 11 formula 12 wherein each of $R^{46}$ to $R^{63}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$; X represents $CH_2$, O, S, NH, $NR^{98}$ or $CO_2$; and each of $R^{97}$ and $R^{98}$ represents a C1-C6 alkyl group:

[formula 13]

wherein X represents $CH_2$, O, S. NH, $NR^{98}$ or $CO_2$; each of $R^{84}$ to $R^{88}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$; and each of $R^{97}$ and $R^{98}$ represents a C1-C6 alkyl group:

[formula 14]

wherein X represents $CH_2$, O, S, NH, $NR^{98}$ or $CO_2$; each of $R^{64}$ to $R^{72}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$; and each of $R^{97}$ and $R^{98}$ represents a C1-C6 alkyl group:

[formula 15]

wherein X represents $CH_2$, O, S, NH, $NR^{98}$ or $CO_2$; each of $R^{73}$ to $R^{83}$ independently or simultaneously represents H, a C1-C6 alkyl group, OH, $OR^{97}$, CN, $NO_2$, COOH, $CO_2R^{97}$, $CONH_2$, $CONR^{98}{}_2$ or $NR^{98}{}_2$; and each of $R^{97}$ and $R^{98}$ represents a C1-C6 alkyl group:

[formula 16]

wherein each of $R^{89}$ to $R^{94}$ independently or simultaneously represents H, a C1-C6 alkyl group, OH, $OR^{97}$, CN, $N_2$, COOH, $CO_2R^{97}$, $CONH_2$, $CONR^{98}{}_2$ or $NR^{98}{}_2$; each of $R^{95}$ and $R^{96}$ independently or simultaneously represents H or a C1-C6 alkyl group; and each of $R^{97}$ and $R^{98}$ represents a C1-C6 alkyl group.

13. A metal oxide electrode coated with an electrochromic material as defined in claim 1 or 3

14. An electrochromic device comprising a first electrode disposed on a transparent or translucent substrate, a second electrode and an electrolyte, wherein at least one of the first electrode, second electrode and electrolyte comprises an electrochromic material as defined in claim 1 or 3.

* * * * *